(12) United States Patent
Kashiwagi et al.

(10) Patent No.: US 8,506,150 B2
(45) Date of Patent: Aug. 13, 2013

(54) BACKLIGHT DEVICE AND DISPLAY APPARATUS

(75) Inventors: Masako Kashiwagi, Kanagawa (JP); Shinichi Uehara, Tokyo (JP); Masahiro Baba, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 219 days.

(21) Appl. No.: 13/212,046

(22) Filed: Aug. 17, 2011

(65) Prior Publication Data
US 2012/0224389 A1 Sep. 6, 2012

(30) Foreign Application Priority Data

Mar. 4, 2011 (JP) ................................. 2011-047488

(51) Int. Cl.
*F21V 7/04* (2006.01)
*F21V 8/00* (2006.01)
*F21V 5/00* (2006.01)

(52) U.S. Cl.
USPC ............................ 362/607; 362/623; 362/625

(58) Field of Classification Search
USPC ................. 362/606, 607, 608, 623, 624, 625, 362/627
See application file for complete search history.

(56) References Cited

U.S. PATENT DOCUMENTS

| | | | | |
|---|---|---|---|---|
| 5,552,907 A | * | 9/1996 | Yokota et al. | 349/62 |
| 5,598,280 A | * | 1/1997 | Nishio et al. | 349/57 |
| 6,791,639 B2 | * | 9/2004 | Colgan et al. | 349/95 |
| 7,717,600 B2 | * | 5/2010 | Lim et al. | 362/606 |
| 7,876,397 B2 | * | 1/2011 | Krijn et al. | 349/65 |
| 7,967,494 B2 | * | 6/2011 | Chi et al. | 362/626 |
| 8,262,274 B2 | * | 9/2012 | Kim et al. | 362/615 |
| 8,339,538 B2 | * | 12/2012 | Uehara et al. | 349/64 |
| 2006/0056166 A1 | * | 3/2006 | Yeo et al. | 362/19 |

FOREIGN PATENT DOCUMENTS

| | | |
|---|---|---|
| JP | 2005-077437 | 3/2005 |
| JP | 2010-127973 | 6/2010 |

OTHER PUBLICATIONS

Kashiwagi et al.; "Display Apparatus and Back Light Apparatus", U.S. Appl. No. 13/049,958, filed Mar. 17, 2011.

* cited by examiner

*Primary Examiner* — Alan Cariaso
(74) *Attorney, Agent, or Firm* — Finnegan, Henderson, Farabow, Garrett & Dunner, L.L.P.

(57) ABSTRACT

According to one embodiment, a backlight device includes a light source, a light guide plate, a light beam controller, and a directivity control element. The light guide plate is formed with plural diffusion portions that diffuse light from the light source. The light beam controller is configured to emit plural linear light beams. The directivity control element has plural optical openings. The optical openings extend in a second direction and are arranged in a first direction perpendicular to the second direction. The light beam controller emits the linear light beams that extend in a third direction tilted with respect to the second direction. The light guide plate has a first region in which the diffusion portions are formed in the third direction and a second region in which no diffusion portions are formed, the first region and the second region being arranged alternately in the first direction.

9 Claims, 12 Drawing Sheets

BACKLIGHT DEVICE AND DISPLAY APPARATUS

CROSS-REFERENCE TO RELATED APPLICATION

This application is based upon and claims the benefit of priority from Japanese Patent Application No. 2011-047488, filed on Mar. 4, 2011; the entire contents of which are incorporated herein by reference.

FIELD

Embodiments described herein relate generally to a display apparatus and a backlight device used in the display apparatus.

BACKGROUND

As a three-dimensional image display system, for which no dedicated glasses or the like are required, a system is known in which a light beam directivity control element is provided on a display panel such as a liquid crystal display or a plasma display. In this system, light beams from the display panel are controlled by the light beam directivity control element so that the light beams reach positions of viewer's eyes. This system is known as a system that can be embodied relatively easily by combining a common display panel with the light beam directivity control element. The light beam directivity control element typically includes a parallax barrier or a lenticular lens and controls light beams so that different images can be viewed depending on the viewing angle direction. This system, however, is disadvantageous in that the resolution of three-dimensional images is lowered and in that the visual quality of two-dimensional images is likely to be lowered. Therefore, directional backlight technologies that control directions of light beams at the backlight are under development.

For example, a known method includes arranging point light sources on a back surface of a light beam directivity control element and changing the direction of directivity at the backlight by switching lighting positions of light sources through time division driving. There is also known a structure in which line light sources are arranged on a back surface of a light beam directivity control element and the arrangement angle of the line light sources are tilted with respect to an edge line direction of the light beam directivity control element. With this structure, different directivities can be provided for respective lines in the column direction of a display panel. A structure in which each line light source is formed by a divided light guide plate is known as an example of the line light source.

DETAILED DESCRIPTION

Figure 1:
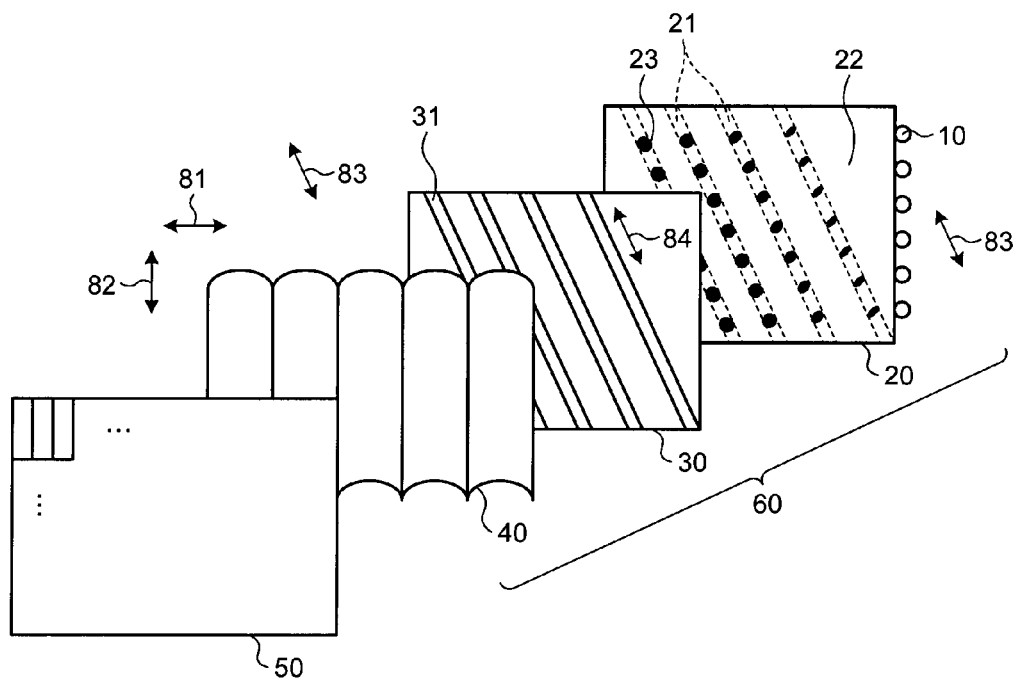
FIG. 1 illustrates a display apparatus and a backlight device according to a first embodiment.

In general, according to one embodiment, a backlight device includes a light source, a light guide plate, a light beam controller, and a directivity control element. The light guide plate is formed with plural diffusion portions that diffuse light from the light source. The light beam controller is configured to emit plural linear light beams. The directivity control element has plural optical openings. The optical openings extend in a second direction and are arranged in a first direction perpendicular to the second direction. The light beam controller emits the linear light beams that extend in a third direction tilted with respect to the second direction. The light guide plate has a first region in which the diffusion portions are formed in the third direction and a second region in which no diffusion portions are formed, the first region and the second region being arranged alternately in the first direction.

Embodiments will be described below in detail with reference to the accompanying drawings. In the embodiments below, parts designated by the same reference numerals operate similarly and redundant descriptions thereof will not be repeated as appropriate.

First Embodiment

A backlight device and a display apparatus according to the first embodiment will be described referring to FIGS. 1 to 6. FIG. 1 illustrates a configuration example of a display apparatus according to the first embodiment. The display apparatus of this embodiment includes a display panel 50 and a backlight device 60. The backlight device 60 is arranged at the back of the display panel 50 as viewed from the viewer side. The backlight device 60 includes a lenticular sheet 40, an anisotropic diffusing element 30, a light guide plate 20 and light sources 10. The lenticular sheet 40 is arranged at the back of the display panel 50, and the anisotropic diffusing element 30 and the light guide plate 20 are arranged in this order at the back of the lenticular sheet 40.

The display panel 50 is a transmission type display panel having pixels arrayed in a matrix on a display surface thereof. For example, a liquid crystal panel may be used.

The lenticular sheet 40 is used as a directivity control element in this embodiment. A plurality of cylindrical lenses forming optical openings is arranged on the lenticular sheet 40. The cylindrical lenses on the lenticular sheet 40 each have an edge line extending in a second direction 82, and are arranged in a manner that the edge lines thereof are in parallel along a first direction 81. The first direction 81 and the second direction 82 are perpendicular to each other. On the display panel 50, pixels in a row direction are arranged along the first direction 81, and pixels in a column direction are arranged along the second direction 82.

The anisotropic diffusing element 30 is used as a light beam controller, and arranged between the lenticular sheet 40 and the light guide plate 20. The anisotropic diffusing element 30 has a higher diffusion property in a certain direction than in other directions. In FIG. 1, a direction 84 that is the same as a third direction 83 is indicated as an example of the direction in which a diffusion angle is the maximum. An anisotropic diffusing element 30 that has a higher diffusion property in the third direction 83 than in directions other than the third direction 83 can be used, for example. The direction (certain direction) with a large diffusion property is not limited to the third direction 83. The direction with a large diffusion property may be one in which light beams emitted from the anisotropic diffusing element 30 overlap to be connected substantially linearly along the third direction 83 on a plane of incidence of the lenticular sheet 40. The anisotropic diffusing element 30 is, for example, an element made of synthetic resin with concave and convex portions. The concave and convex portions refer to a shape with a plurality of grooves and curvature shapes. Since the diffusion property increases as the degree of concaves and convexes is larger, the degree of concaves and convexes in the third direction 83 is larger than that in other directions.

The light guide plate 20 has a rectangular parallelepiped shape having edges parallel to the second direction 82, for example, and is arranged at the back of the anisotropic diffusing element 30. The light guide plate 20 is formed of a transparent substrate made of plastic resin, for example. Light beams emitted from the light sources 10 are incident on the light guide plate 20 and totally reflected in the light guide plate 20 and propagate therethrough.

The light guide plate 20 has regions 21 (first regions) in which diffusion portions 23 are formed and regions 22 (second regions) in which no diffusion portions 23 are formed. The first and second regions are alternately arranged along the first direction 81. These regions extend along the third direction 83. For example, the diffusion portions 23 may be arranged in a pattern of dots as illustrated in FIG. 1. The dot-like diffusion portions 23 are arranged linearly along the third direction 83 and form the regions 21 in which the diffusion portions 23 are formed. The regions 21 in which the diffusion portions 23 are formed have a constant width in the first direction 81 within the plane of the light guide plate 20, and are arranged at equal intervals in the first direction 81.

LEDs are used for the light sources 10 in this embodiment. The light sources 10 are provided on one edge parallel to the second direction 82 of the light guide plate 20.

Next, operations of the backlight device 60 according to this embodiment will be described. In the backlight device of this embodiment, light beams emitted from the light sources 10 are incident on the edge of the light guide plate 20, and are totally reflected in and propagate through the light guide plate 20. Light that has reached the diffusion portions 23 is diffused by the diffusion portions 23, and the total reflection condition becomes unsatisfied. As a result, the light is emitted from the light guide plate 20 toward the anisotropic diffusing element 30. Thus, light is emitted from the parts where the diffusion portions 23 are present but no light is emitted from the other parts. In other words, the light partially extracted in the light guide plate 20 is emitted from the light guide plate 20.

Figure 2:
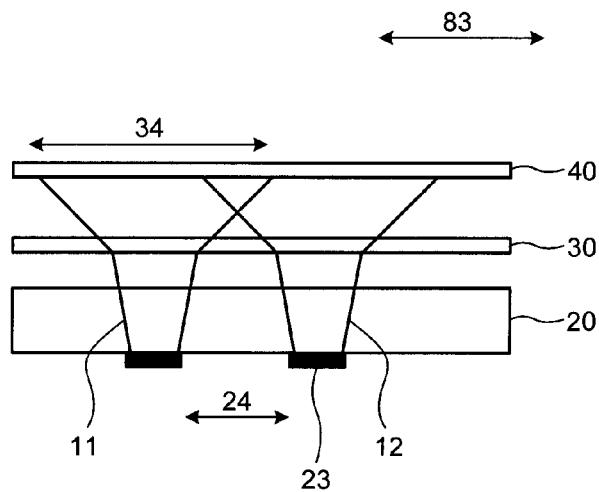
FIG. 2 is an explanatory view illustrating diffusion of light beams due to diffusion characteristics in the backlight device according to the first embodiment.

FIG. 2 is a sectional view of the backlight device 60 according to this embodiment. As illustrated in FIG. 2, light beams incident on the anisotropic diffusing element 30 are diffused in the third direction 83 owing to anisotropic diffusion characteristics thereof. A diffused light beam 11 is directed to the plane of incidence of the lenticular sheet 40. The width in the third direction 83 of the light beam is a light beam width 34. The light beam width 34 depends on the distance between the lenticular sheet 40 and the anisotropic diffusing element 30.

Figure 3:
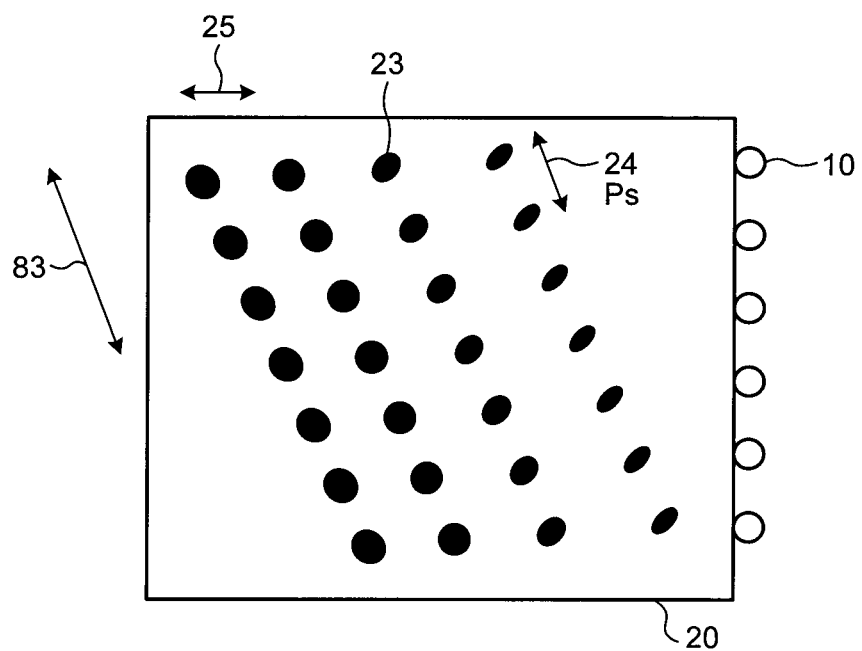
FIG. 3 is an explanatory view of an arrangement of diffusion portions in the backlight device according to the first embodiment.

FIG. 3 illustrates a dot interval in the third direction 83 of the diffusion portions 23. A dot interval $p_s$ 24 of the diffusion portions 23 is smaller than the light beam width 34. As a result, a light beam 12 adjacent to the light beam 11 overlaps with the light beam 11 to be connected substantially linearly along the third direction 83 at the plane of incidence of the lenticular sheet 40 as illustrated in FIG. 2.

The linear light beams incident on the lenticular sheet 40 are spread with directivity in a plurality of directions by the lenticular sheet 40. The number of directions of directivity is determined by a difference in angle between the second direction 82 that is the edge line direction of the lenticular sheet 40 and the third direction 83 that is the tilt direction of the linear beams.

The number of directions of directivity is defined by a pixel width of the display panel 50. For example, if the number of directions of directivity is four, the third direction 83 is tilted such that a width corresponding to four pixels in the column direction of the display panel 50 is assigned to the width in the first direction 81 of each cylindrical lens of the lenticular sheet 40. In this case, one direction of directivity is assigned to one row and thus four directions of directivity are assigned to four rows, respectively, in the display panel 50.

Next, one example of advantageous effects of this embodiment will be described.

In the backlight device according to this embodiment, the regions in which the diffusion portions 23 are formed and arranged linearly and the regions in which no diffusion portions 23 are formed are provided on the light guide plate 20, line light sources are realized by using the arrangement of the diffusion portions 23 and the diffusion properties of the anisotropic diffusing element 30, and light beams having directivity in a plurality of directions are emitted by the lenticular sheet 40. The tilt and the pitch of linear light beams can be changed only by changing the arrangement of the diffusion portion 23 and the diffusing direction of the anisotropic diffusing element 30. As a result, the number of light beams having directivity can easily be increased.

In order to increase the number of directivities in the aforementioned conventional technology in which point light sources are arranged, it is necessary to also increase the number of LED light sources arranged on a back surface of the lenticular sheet 40 and change the installation conditions of the light sources. In addition, if the maximum angle of the directivity is fixed, it is necessary to reduce the width of the light sources without changing the pitch of the lens portions of the lenticular sheet 40. In practice, however, it is difficult to make the LED light sources smaller.

In this embodiment, on the other hand, the diffusion portions 23 can be formed by silk-screen printing, for example. This method is known to be simple and inexpensive, and further to have high flexibility in the shapes of the diffusion portions 23. The width of the linear light beams corresponds to the width of the regions where the diffusion portions 23 are formed. Accordingly, it is also easy to reduce the width of the linear light beams. It is thus possible to increase the number of directivities of light beams without being limited by the size or the installation conditions of the light sources 10 and without increasing the number of the light sources 10.

Moreover, in order to reduce the number of light sources in the aforementioned conventional technology in which point light sources are arranged, a method of increasing the lens pitch of the lenticular sheet 40 and a method of increasing the interval between the light sources in the linear light beam tilt direction can be considered.

However, if the lens pitch is increased, the distance between the light sources and the lenticular sheet 40 is increased under a condition that the range of the angle at which directive light is emitted is constant. Furthermore, the lenses are likely to have a shape that generates stray light. If the interval between the light sources is increased, the distance between the light sources and the anisotropic diffusing element needs to be increased so as to make the dot-like light sources linearly continuous using the diffusion characteristics of the anisotropic diffusing element. As a result, the backlight device becomes larger. In other words, side effects are generated. In this embodiment, the number of directivities of light beams can be easily increased without producing such disadvantageous effects.

As compared to the conventional technology in which the line light source is formed by a divided light guide plate, the directivities of light beams can be increased without dividing the light guide plate. For the reasons mentioned above, the backlight device according to this embodiment can increase the number of directivities with a simple structure.

Figure 4:
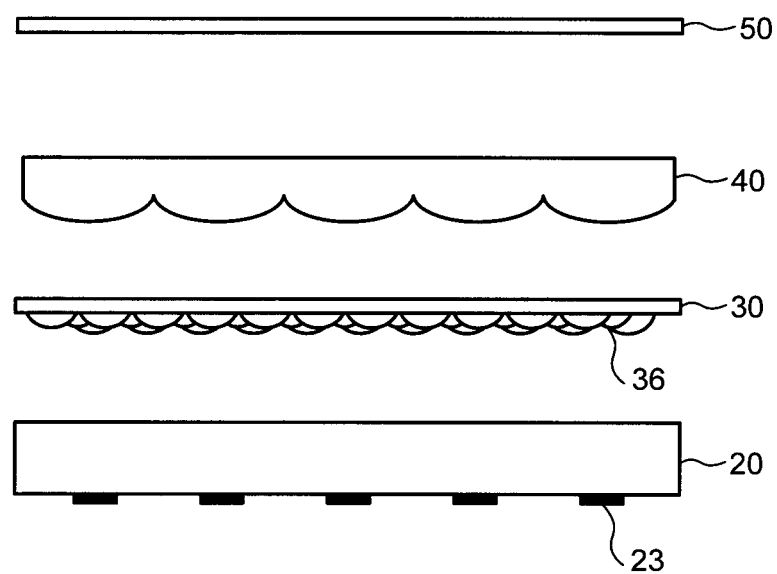
FIG. 4 is an explanatory view of an arrangement of an anisotropic diffusing element in the backlight device according to the first embodiment.
Figure 5:
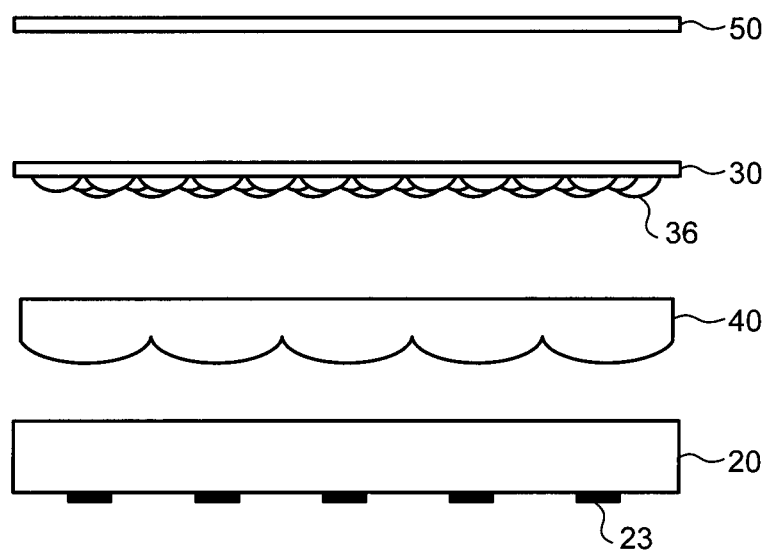
FIG. 5 is an explanatory view of an arrangement of an anisotropic diffusing element in the backlight device according to the first embodiment.

FIGS. 4 and 5 are sectional views explaining the orientation and the arrangement of convex portions 36 of the anisotropic diffusing element 30. FIG. 4 is a view in which the anisotropic diffusing element 30 is arranged between the light guide plate 20 and the lenticular sheet 40 as illustrated in FIG. 1 described above. The convex portions 36 of the anisotropic diffusing element 30 and convex portions of the lenticular sheet 40 are arranged to face the light guide plate 20. In particular, if the light guide plate 20 is a parallel plate, it is possible to prevent close adhesion between the anisotropic diffusing element 30 and the light guide plate 20 and reduce adhesion unevenness by arranging the convex portions 36 of the anisotropic diffusing element 30 to face the light guide plate 20. As a result, visual quality of images can be improved. Similarly, it is preferable to arrange the lenticular sheet 40 so that the convex portions thereof face the anisotropic diffusing element 30.

FIG. 5 is a view in which the anisotropic diffusing element 30 is arranged between the lenticular sheet 40 and the display panel 50. In the same manner, the visual quality can be improved by preventing close adhesion between flat surfaces of the light guide plate 20, the lenticular sheet 40 and the anisotropic diffusing element 30. However, if the light guide plate 20, the anisotropic diffusing element 30 and the lenticular sheet 40 do not have flat surfaces, the convex portions may face either side.

Although an example in which the anisotropic diffusing element 30 is arranged between the light guide plate 20 and the lenticular sheet 40 is mainly explained in this embodiment, the anisotropic diffusing element 30 may be arranged between the lenticular sheet 40 and the display panel 50 as illustrated in FIG. 5.

In addition, although an example in which the lenticular sheet 40 is used as the directivity control element is explained, an optical element such as a prism array or a fly-eye lens may be used. In the case of the prism array, each prism forms an optical opening. In the case of the fly-eye lens, each of single lenses constituting the fly-eye lens forms an optical opening. Alternatively, a liquid crystal lens or a liquid lens that can be controlled to have a plurality of optical openings may be used as the directivity control element. In particular, a lens using polymer-dispersed liquid crystal may be used. The latter case can be suitably applied to switching between 2D and 3D.

The diffusion portions 23 can be formed by silk-screen printing as described above, and the material thereof is not limited to white ink or ultraviolet-sensitive resin containing titanium oxide ($TiO_2$) or the like. A material such as silver having reflection characteristics may alternatively be applied to the diffusion portions 23. Furthermore, the forming method is not limited to silk-screen printing. The light guide plate 20 may have a structure with grooves that are formed by cutting or laser beam machining. The shapes of the diffusion portions 23 are not limited to dot-like shapes, and may be circular shapes, elliptical shapes, rectangular or the like.

Although an example in which LEDs are used for the light sources 10 is presented, the light sources 10 may be spontaneous light emitting elements such as plasma generating elements, organic ELs and CCFLs.

Furthermore, although an example in which the light sources 10 are provided on one edge parallel to the second direction 82 of the light guide plate 20 is explained, the light sources 10 may be provided on another edge perpendicular to the second direction 82 of the light guide plate 20. Alternatively, the light sources 10 may be provided on all the edges of the light guide plate 20.

Figure 6:
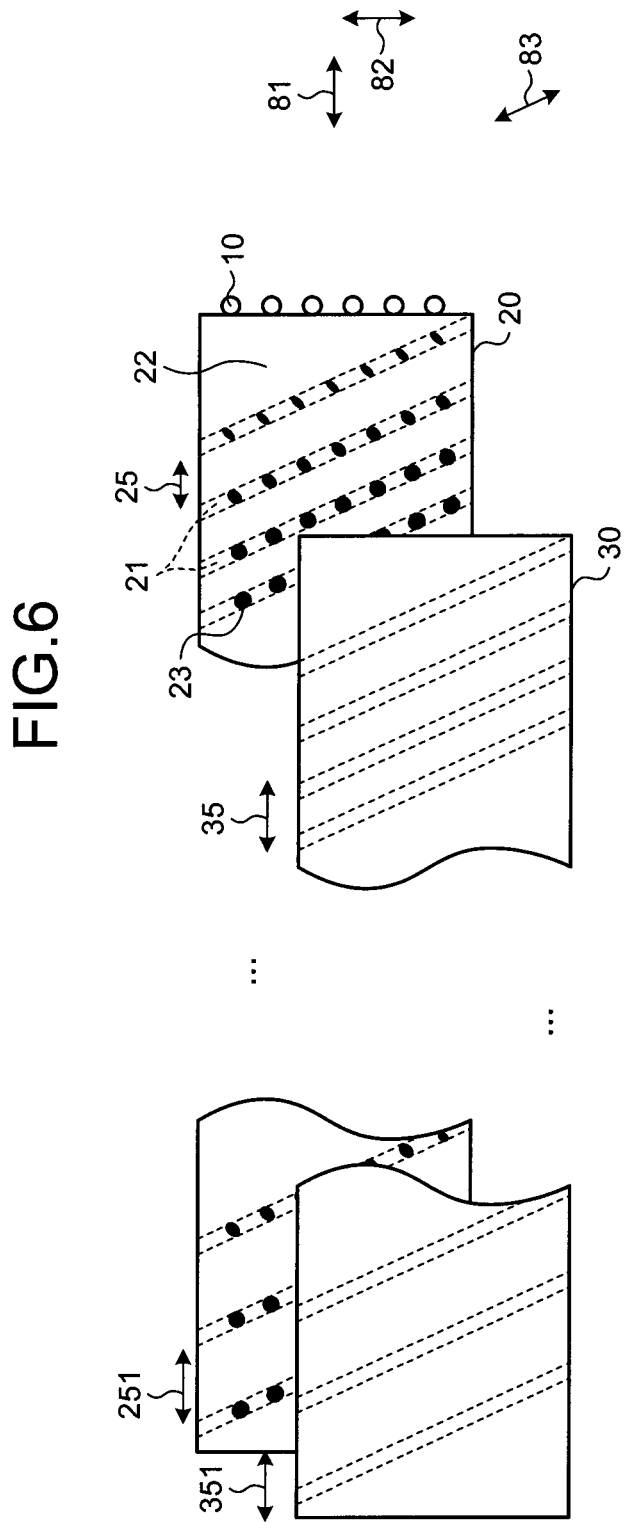
FIG. 6 is an explanatory view of pitches in a diffusion region in the backlight device according to the first embodiment.

In this embodiment, the arrangement pitch 25 in the first direction 81 of the regions 21 in which the diffusion portions 23 are formed is explained to be equal within the plane of the light guide plate 20. The arrangement pitch 25 is not limited to be equal within the plane, and may be non-uniform within the plane. For example, the arrangement pitch 25 near the light sources 10 in the first direction 81 of the regions 21 in which the diffusion portions 23 are formed may be different from the arrangement pitch 251 around a position away from the light sources 10 as illustrated in FIG. 6. A normal image can be viewed at each point of view on the display panel 50 by sampling image corresponding to the directivity of light beams.

First Modified Example of First Embodiment

Figure 7:
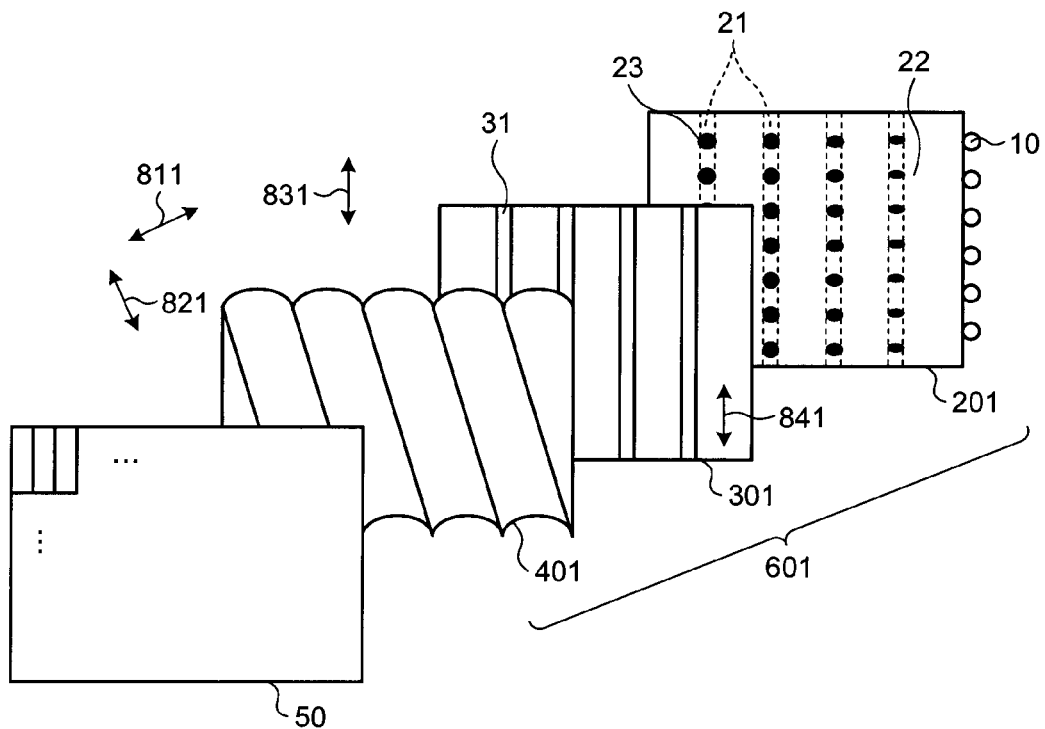
FIG. 7 illustrates a display apparatus and a backlight device according to a first modified example of the first embodiment.

Next, FIG. 7 illustrates a configuration example of a backlight device and a display apparatus according to a first modified example of the first embodiment.

The display device according to this modified example includes a display panel 50 and a backlight device 601. The backlight device 601 according to this modified example is different from that of the first embodiment described above in the tilt of the edge line direction of a lenticular sheet 401 thereof, the arrangement direction of cylindrical lenses, the diffusion direction of an anisotropic diffusing element 301, and the extending directions of regions 21 and regions 22 within a light guide plate 201. In this modified example, the edge line direction of the lenticular sheet 401 is a second direction 821, and the arrangement direction of the cylindrical lenses is a first direction 811. Both of the directions are different from the arrangement direction of the pixels of the display panel 50 and tilted. The direction at which the diffusion property of the anisotropic diffusing element 301 is the maximum is a third direction 831, which is different from the second direction 821. The light guide plate 201 has a rectangular parallelepiped shape having edges parallel to the third direction 831. The second direction 821 is not parallel to the edges of the light guide plate 20.

As presented in this modified example, the edge line direction of the lenticular sheet 401 only needs to be different from the direction at which the diffusion property of the anisotropic diffusing element 301 is the maximum, and need not be the same direction as the arrangement direction of pixels in the display panel 50. That is, provided that a condition where the second direction 821 is not the same as the third direction 831, the lenticular sheet 401 can give directivity to light beams as in the first embodiment whichever direction the second direction 821 is.

The edge line direction of the lenticular sheet 401 may be determined depending on the installation environment and the manufacturing accuracy of the backlight device 601.

Hereinafter, embodiments will be described using the example in which the light guide plate 20 has a rectangular parallelepiped shape having edges parallel to the second direction 82 as in FIG. 1. The embodiments can also be applied to the configuration example as illustrated in FIG. 7.

Second Embodiment

Figure 8:
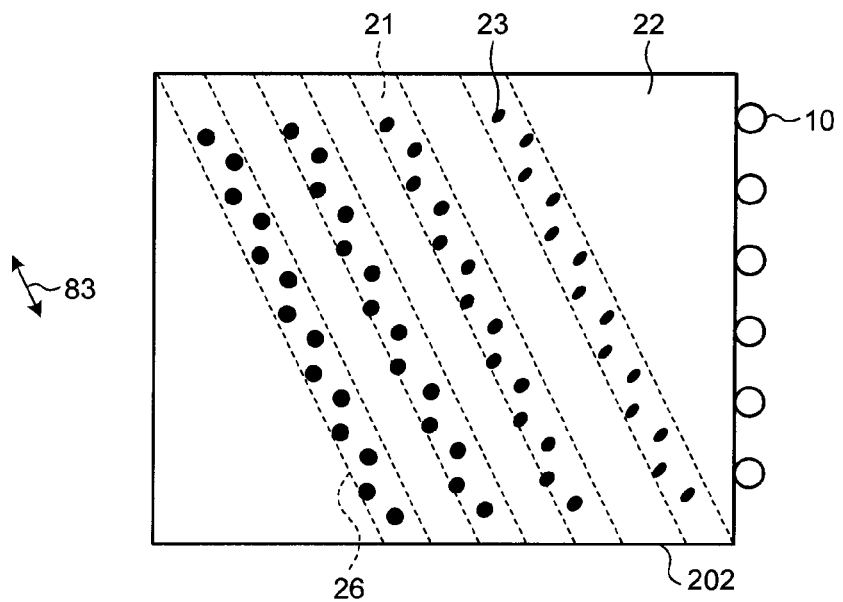
FIG. 8 illustrates a pattern of diffusion portions according to a second embodiment.

Next, a backlight device and a display apparatus according to the second embodiment will be described referring to FIG. 8. FIG. 8 is a top view illustrating a configuration example of diffusion portions 23 applied to a light guide plate 202 according to this embodiment. This embodiment is different from the first embodiment described above in the arrangement of the diffusion portions 23.

In the first embodiment described above, the dot-like diffusion portions 23 are arranged linearly along the third direction 83. In this embodiment, however, the diffusion portions 23 have dot-like shapes but are not arranged in a manner limited on certain straight lines along the third direction 83. That is, the diffusion portions 23 are arranged randomly in the regions 21 in this embodiment. For example, the dot-like diffusion portions 23 are arranged in a zigzag manner in the regions 21 in which the diffusion portions 23 are formed as illustrated in FIG. 8. The zigzag arrangement does not follow any rule but is random. The configuration and operation of this embodiment other than those described above are the same as in the first embodiment described above.

In this embodiment, the degree of freedom in the pattern of the diffusion portions 23 is improved and the uniformity of luminance of linear light beams 31 in the third direction 83 can be improved by arranging the diffusion portions 23 randomly. The shapes of dots may be circular, elliptical, rectangular or the like, and are not particularly limited. Different dot shapes may be mixed within the light guide plate 202.

Third Embodiment

Figure 9:
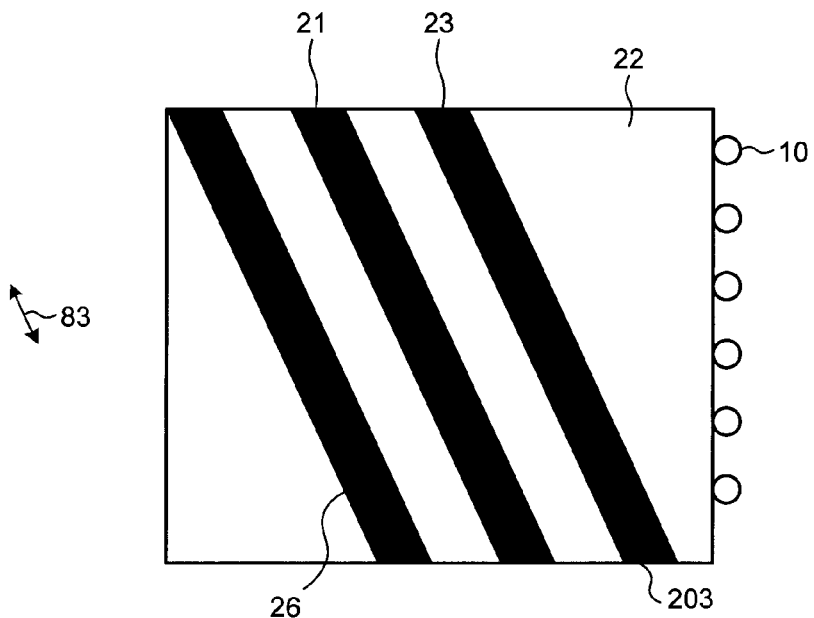
FIG. 9 illustrates a pattern of diffusion portions according to a third embodiment.

Next, a backlight device and a display apparatus according to the third embodiment will be described referring to FIG. 9. FIG. 9 is a top view illustrating a configuration example of diffusion portions 23 applied to a light guide plate 203 according to this embodiment. This embodiment is different from the first embodiment described above in the shapes of the diffusion portions 23.

In the first embodiment described above, the dot-like diffusion portions 23 are arranged linearly along the third direction 83. In this embodiment, however, the diffusion portions 23 are in the form of lines and arranged in regions 21 in which the diffusion portions 23 are formed. The shapes of the diffusion portions 23 are the same as those of the regions 21 in which the diffusion portions 23 are formed. That is, the linear patterns of the diffusion portions 23 are aligned along the first direction 81 and extend in the third direction 83. In this case, the width thereof in the first direction 81 is constant. The configuration and operation of this embodiment other than those described above are the same as in the first embodiment described above.

In this embodiment, the diffusion portions 23 are formed in the form of a linear pattern. The linear pattern is simpler than the dot-like shapes, and the width in the first direction 81 of the linear light beams 31 is easier to control. As a result, the uniformity in the width of the linear light beams can be improved, and the unevenness of display caused by width variation can be reduced, for example. The linear pattern is not limited to the same shapes as the regions 21 in which the diffusion portions 23 are formed, and a plurality of linear patterns may be formed within a region 21 in which the diffusion portions 23 are formed.

Fourth Embodiment

Figure 10:
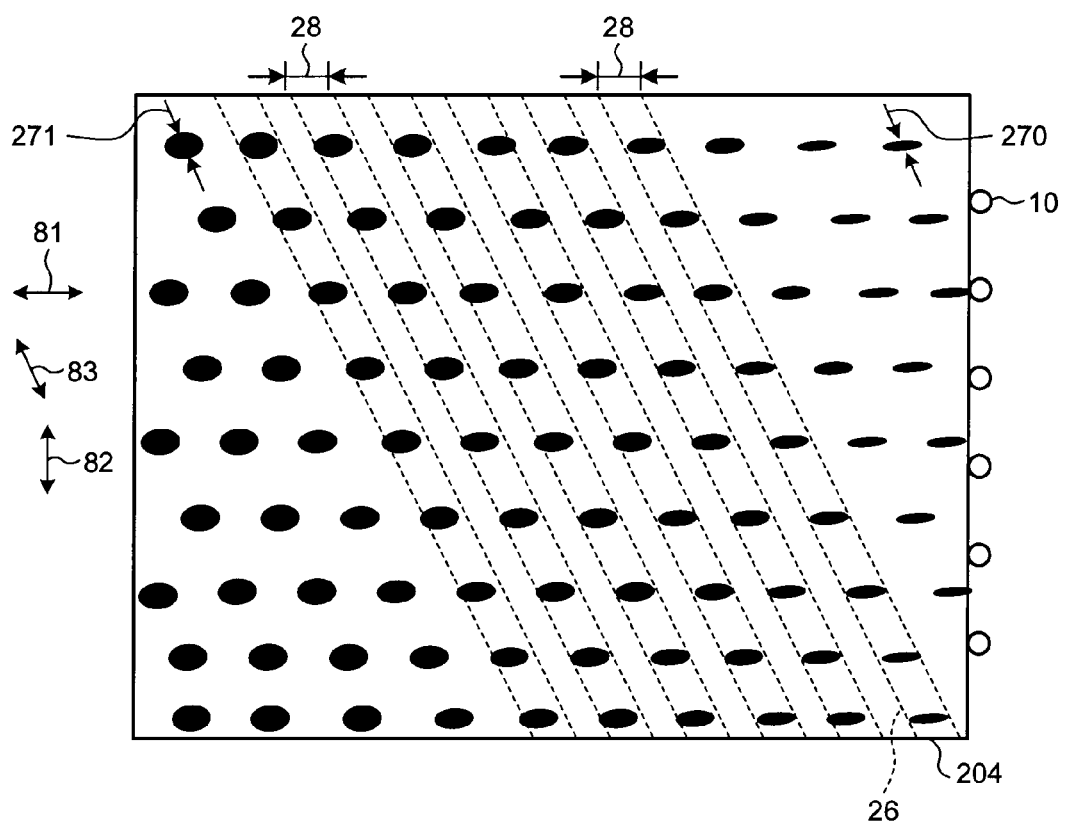
FIG. 10 illustrates a pattern of diffusion portions according to a fourth embodiment.

Next, a backlight device and a display apparatus according to the fourth embodiment will be described referring to FIG. 10. FIG. 10 is a top view illustrating a configuration example of diffusion portions 23 applied to a light guide plate 204 according to this embodiment. This embodiment is different from the first embodiment described above in the in-plane distribution of the shapes of the diffusion portions 23.

In the first embodiment described above, the in-plane distribution of the dot-like diffusion portions 23 is not particularly defined. In this embodiment, however, the width 28 of the regions 21 in which the diffusion portions 23 are formed is constant in the first direction 81 within the light guide plate 204. In addition, the width of the diffusion portions 23 in the third direction 83 becomes smaller as the diffusion portions 23 are nearer to light sources.

As described above, the light sources 10 are provided on one edge parallel to the second direction 82 of the light guide plate 204. The diffusion portions 23 near the light sources 10 have a width 270 in the third direction 83. The diffusion portions 23 farther from the light sources 10 have a width 271 in the third direction 83. The width 270 is smaller than the width 271.

The amounts of variation of the width 270 and the width 271 can be determined from values optimized so that the luminance of the linear light beams 31 that have passed through the anisotropic diffusing element 30 becomes substantially uniform in the third direction 83 under conditions such as light distribution characteristics of the light sources 10 and light guide characteristics of the light guide plate 204. The configuration and operation of this embodiment other than those described above are the same as in the first embodiment described above.

In the backlight device of this embodiment, light beams emitted from the light sources 10 are incident on the edge of the light guide plate 204, and are totally reflected in and propagate through the light guide plate 204 as described above. Then, light that has reached the diffusion portions 23 is diffused by the diffusion portions 23, and the total reflection condition becomes unsatisfied. As a result, the light is emitted from the light guide plate 204 toward the anisotropic diffusing element 30. The amount of light emitted from the diffusion portions 23 toward the anisotropic diffusing element 30 is dependent on the area of the diffusion portions 23.

The amount of light emitted from the light sources 10 is finite, and it is thus necessary to cause the totally reflected components of light near the light sources 10 to remain so that light reaches a region distant from the light sources 10 in the light guide plate 204. The amount of light emitted by the diffusion portions 23 can be made equal at a region near the light sources 10 and at a region distant from the light sources 10 by making the width in the third direction 83 of the diffusion portions 23 near the light sources 10 smaller and the area thereof smaller. The width 28 of the regions 21 in which the diffusion portions 23 are formed is constant within the light guide plate 204. Thus, linear light beams emitted from the anisotropic diffusing element 30 have uniform widths. As a result, the in-plane uniformity can be improved without any negative effect on the directivities of light beams emitted by the backlight device.

First Modified Example of Fourth Embodiment

Figure 11:
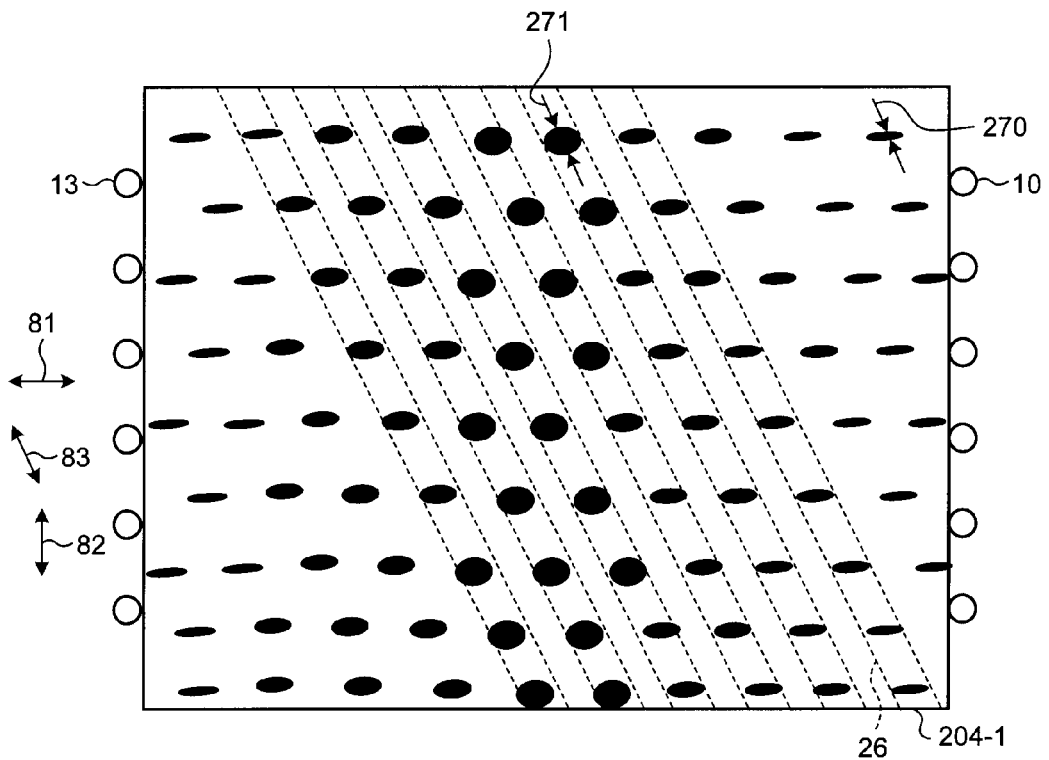
FIG. 11 illustrates a pattern of diffusion portions according to a first modified example of the fourth embodiment.

Next, a backlight device and a display apparatus according to the first modified example of the fourth embodiment will be described referring to FIG. 11. FIG. 11 is a top view illustrating a configuration example of diffusion portions 23 and light sources 10 and 13 applied to a light guide plate 204-1 according to this modified example. The first modified example is different from the fourth embodiment described above in the arrangement of light sources (light sources 10 and 13) and in the arrangement and the shapes of diffusion portions 23.

In the fourth embodiment described above, the light sources 10 are provided on one edge parallel to the second direction 82 of the light guide plate 204. In this modified example, in contrast, the light sources 13 are arranged on another edge parallel to the second direction 82 of the light guide plate 204-1 in addition to the light sources 10. Since the light guide plate 204-1 has a rectangular parallelepiped shape as described above, the light sources 10 and the light sources 13 are arranged on opposite edges of the light guide plate 204-1. The positions of the light sources 10 along the second direction 82 correspond to the positions of the light sources 13 along the second direction 82. Accordingly, the light sources 10 are arranged opposite to the light sources 13.

The diffusion portions 23 have dot-like shapes as described above. In this modified example, the width 270 in the third direction 83 of the diffusion portions 23 near the light sources 10 is smaller than the width 271 in the third direction 83 of the diffusion portions 23 distant from the light sources 10. Similarly, in the vicinity of the light sources 13, the width 270 in the third direction 83 of the diffusion portions 23 near the light sources 13 is smaller than the width 271 in the third direction 83 of the diffusion portions 23 distant from the light sources 13. Accordingly, the dot width 271 in the third direction 83 near the center of the light guide plate 204-1 is the maximum. The configuration and operation of this modified example other than those described above are the same as in the fourth embodiment described above.

In this modified example, the uniformity of in-plane luminance can be secured even in the case where the light sources are arranged on both sides of the light guide plate 204-1 to improve the luminance of the backlight device.

Although it has been described in this modified example that the light sources are arranged on edges opposed to each other, in particular on edges parallel to the second direction 82, of the light guide plate 204-1, the arrangement is not limited thereto. For example, the light sources may be arranged on edges that are perpendicular to the second direction 82. In this case, the arrangement and the effect of the pattern of the diffusion portions 23 are similar to those described above. Furthermore, the light sources may be provided on four edges of the light guide plate 204-1, or may be arranged in an L-shape on one edge perpendicular to the second direction 82 and one edge parallel to the second direction 82.

Second Modified Example of Fourth Embodiment

Figure 12:
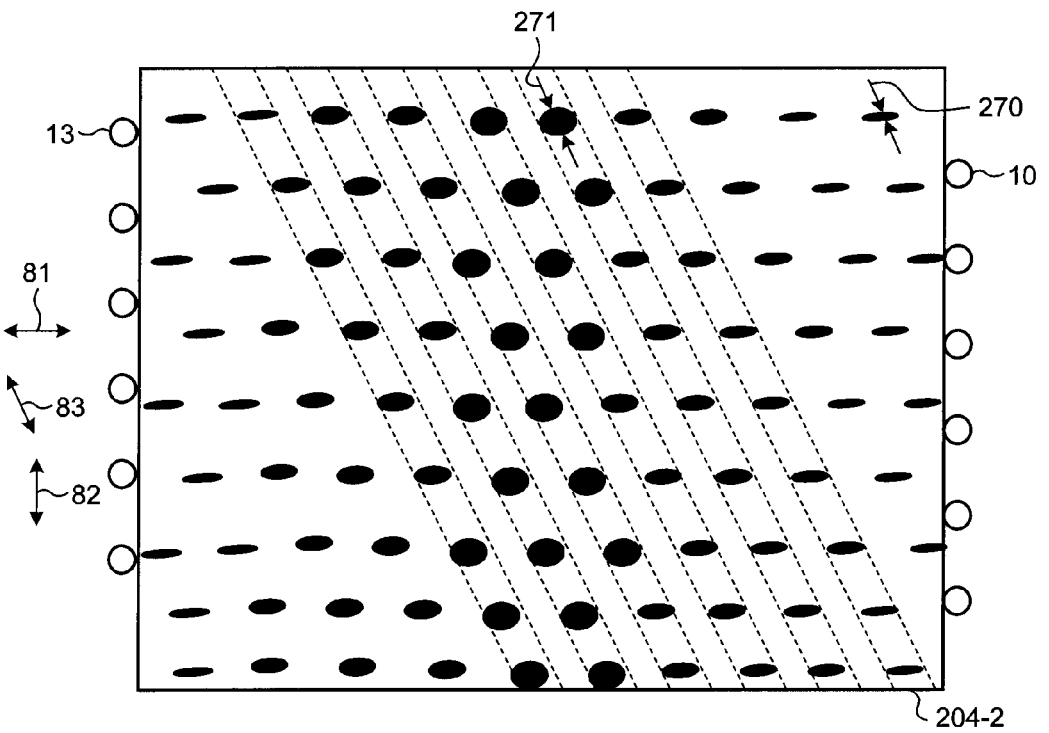
FIG. 12 illustrates a pattern of diffusion portions according to a second modified example of the fourth embodiment.

Next, a backlight device and a display apparatus according to the second modified example of the fourth embodiment will be described referring to FIG. 12. FIG. 12 is a top view illustrating a configuration example of diffusion portions 23 and light sources 10 and 13 applied to a light guide plate 204-2 according to this modified example. This modified example is different from the first modified example (the first modified example of the fourth embodiment) described above in the arrangement of the light sources 10 and 13.

In the first modified example described above, the light sources 10 and the light sources 13 are arranged opposite to each other. In contrast, positions of the light sources 10 and positions of the light sources 13 do not correspond to each other in the second direction 82 in this modified example. For example, the light sources 10 and the light sources 13 are arranged alternately in the second direction 82. The pattern of the diffusion portions 23 is similar to that in the first modified example. The configuration and operation of this modified example other than those described above are the same as in the first modified example described above.

In this modified example, the light sources 10 and the light sources 13 can be adjusted for small areas by controlling each of the light sources 10 and 13 individually. Therefore, the in-plane uniformity can be further improved.

Third Modified Example of Fourth Embodiment

Figure 13:
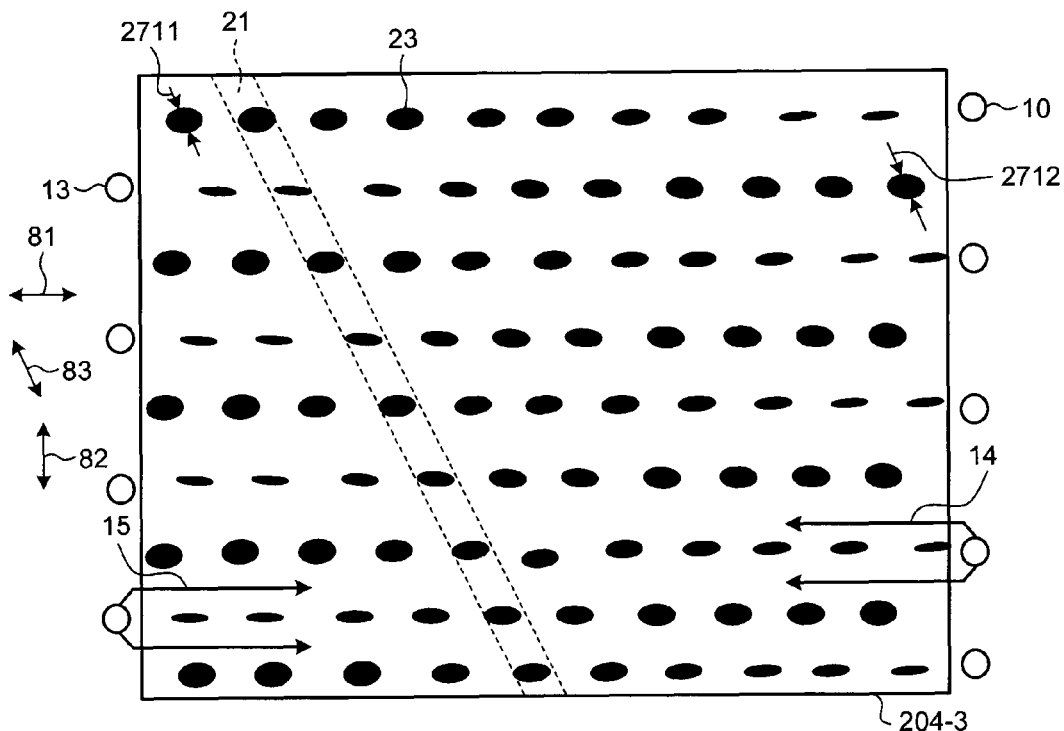
FIG. 13 illustrates a pattern of diffusion portions according to a third modified example of the fourth embodiment.

Next, a backlight device and a display apparatus according to the third modified example of the fourth embodiment will be described referring to FIG. 13. FIG. 13 is a top view illustrating a configuration example of diffusion portions 23 and light sources 10 and 13 applied to a light guide plate 204-3 according to this modified example. The third modified example is different from the second modified example (the second modified example of the fourth embodiment) described above in the arrangement of the light sources 10 and 13 and in the arrangement and the shapes of the diffusion portions 23.

In the second modified example described above, the light sources 10 and the light sources 13 are arranged alternately in the second direction 82, but the positions of the light sources 10 and 13 and the diffusion portions 23 are not defined. In this modified example, in contrast, the diffusion portions 23 are arranged to correspond to each of the light sources 10 and 13 and linearly along the first direction 81. That is, the diffusion portions 23 arranged to correspond to each of the light sources 10 and 13 form a row. In rows corresponding to the light sources 10, the width in the third direction 83 of the diffusion portions 23 near the light sources 10 is smaller than the width 2711 in the third direction 83 of the diffusion portions 23 present distant from the light sources 10. Similarly, in rows corresponding to the light sources 13, the width in the third direction 83 of the diffusion portions 23 near the light sources 13 is smaller than the width 2712 in the third direction 83 of the diffusion portions 23 present distant from the light sources 13. The configuration and operation of this modified example other than those described above are the same as in the first modified example described above.

This modified example can be suitably applied to a case where the light sources 10 and 13 have high directivities, that is, a case where light from the light sources 10 and 13 is not largely diffused in the second direction 82, and the light sources 10 and 13 have light distribution characteristics in which the directivity is high in the first direction 81. As a result, the in-plane uniformity can be improved. In FIG. 13, light beams 14 and 15 are examples of light beams having high directivities emitted from the light sources 10 and 13, respectively.

Fifth Embodiment

Figure 14:
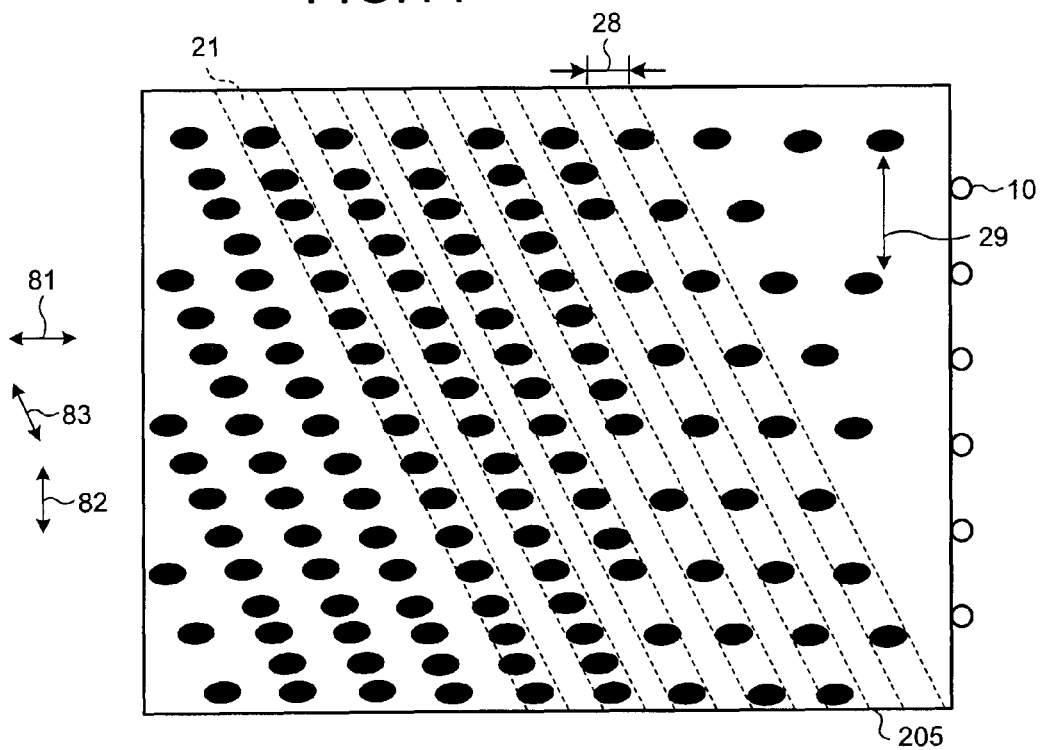
FIG. 14 illustrates a pattern of diffusion portions according to a fifth embodiment.

Next, a backlight device and a display apparatus according to the fifth embodiment will be described referring to FIG. 14. FIG. 14 is a top view illustrating a configuration example of diffusion portions 23 applied to a light guide plate 205 according to this embodiment. This embodiment is different from the fourth embodiment described above in the shapes and the in-plane distribution of the diffusion portions 23.

In the fourth embodiment described above, the width of the diffusion portions 23 in the third direction 83 becomes smaller as the diffusion portions 23 are nearer to the light sources. In this embodiment, however, the width of the diffusion portions 23 does not vary, but the density (dot density) of the diffusion portions 23 within the regions 21 varies. The dot density of the diffusion portions 23 is lower in the region 21 nearer to the light sources 10. Note that a width 28 in the first direction 81 of the regions 21 in which diffusion portions 23 are formed is constant within the light guide plate 205.

In order to vary the dot density, dot intervals 29 in the direction perpendicular to the first direction 81 is made larger near the light sources 10 and smaller in the regions distant from the light sources 10. The configuration and operation of this embodiment other than those described above are the same as in the fourth embodiment described above.

In this embodiment, the luminance in the third direction 83 of the linear light beams that have passed through the anisotropic diffusing element 30 can be uniformized with the structure described above.

First Modified Example of Fifth Embodiment

Figure 15:
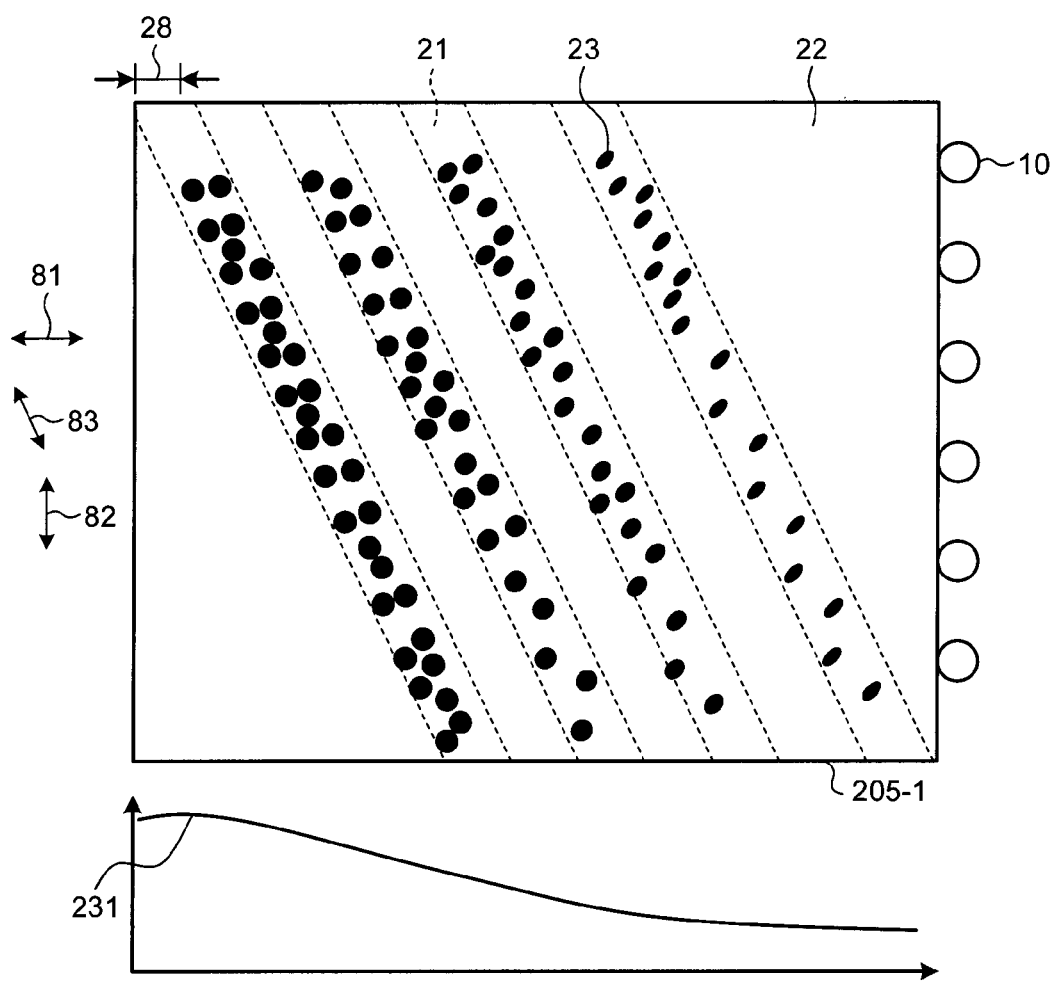
FIG. 15 illustrates a variation of the pattern of the diffusion portions according to the fifth embodiment.

FIG. 15 is a top view illustrating a configuration example of diffusion portions 23 applied to a light guide plate 205-1 according to the first modified example of this embodiment. In the example illustrated in FIG. 14, the diffusion portions 23 are formed linearly along the third direction 83 in the regions 21 in which the diffusion portions 23 are formed. However, as illustrated in FIG. 15, the dot shapes of the diffusion portions 23 may be varied between the regions near the light sources 10 and the regions distant therefrom and the diffusion portions 23 may be arranged randomly in addition to varying the dot density of the diffusion portions 23 as described above depending on the light distribution characteristics and the installation conditions of the light sources 10.

In addition, a sum of dot areas in the second direction 82 is gradually varied along the first direction 81 from the regions near the light sources 10 to those distant therefrom. A graph illustrated in FIG. 15 illustrates an in-plane distribution of the dot areas in the light guide plate 205-1, in which the horizontal axis represents coordinates of the light guide plate 205-1 in the first direction 81 and the vertical axis represents the sum of the dot areas in the second direction 82 at the coordinate positions.

With such a structure, the degree of freedom in the pattern of the diffusion portions 23 is increased and the optimization for uniformizing the luminance becomes easier.

Sixth Embodiment

Figure 16:
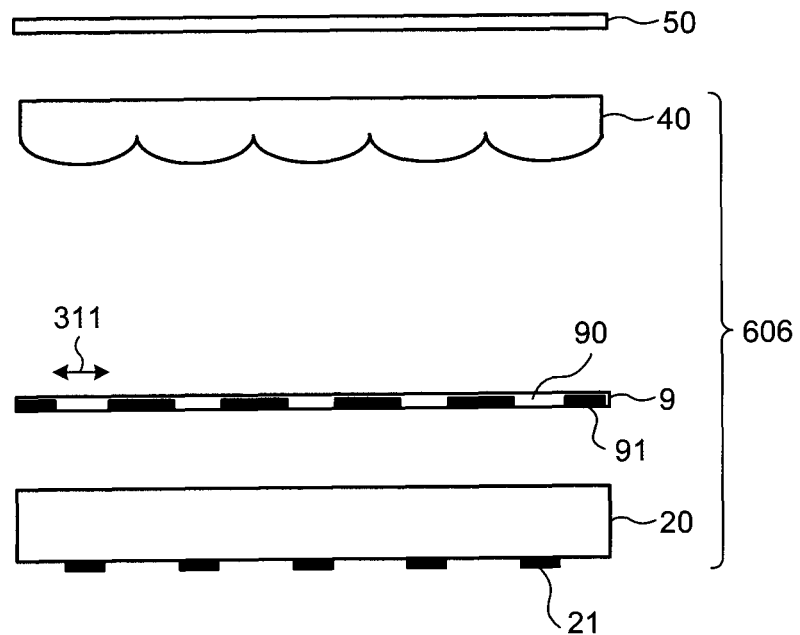
FIG. 16 illustrates a backlight device according to a sixth embodiment.

Next, a backlight device and a display apparatus according to the sixth embodiment will be described referring to FIG. 16. FIG. 16 is a sectional view illustrating a configuration example of a backlight device 606 and a display apparatus according to this embodiment. This embodiment is different from the first embodiment described above in that a slit array 9 is arranged instead of the anisotropic diffusing element 30 as a light beam controller.

That is, in this embodiment, a lenticular sheet 40 is arranged at the back of a display panel 50, and the slit array 9 and a light guide plate 20 are arranged in this order at the back of the lenticular sheet 40. The slit array 9 has a plurality of slits 90 extending along the third direction 83 and arranged along the first direction 81. Light shielding portions 91 are arranged between the slits 90. In other words, the light shielding portions 91 and the slits 90 are arranged alternately along the first direction 81. The slits 90 are provided at positions opposed to the regions 21 in which the diffusion portions 23 are formed in the first direction 81. The configuration and operation of this embodiment other than those described above are the same as in the first embodiment described above.

In this embodiment, linear light beams can be obtained by using the slit array 9, and the directivity can be thus improved. This is due to the effect that the light shielding portions 91 can cover portions other than those for the linear light beams to prevent light leakage at undesired positions. With this configuration, it is possible to prevent extraordinary light or light leakage from being produced as a result of unintended damage on the light guide plate 20, for example, and a light beam pattern can be formed with high accuracy. In addition, the light use efficiency of the light sources 10 can be increased by arranging the regions 21 in which the light diffusion portions 23 are formed so as to correspond to the respective slits 90 of the slit array 9.

The light shielding portions 91 can reuse light with the structure in which the surface of the light shielding portions 91 facing the light guide plate has reflection characteristics and a reflector is provided at the back surface of the light guide plate as viewed from a viewer. Consequently, the light use efficiency can further be increased.

Although the regions 21 in which the diffusion portions 23 are formed are preferably arranged in positions corresponding to those of the respective slits 90, the positions are not necessarily be aligned with those of corresponding slits 90 as long as light can be output through the slits 90. However, the positions are desirably within a range in which the light use efficiency of the light sources 10 is not significantly lowered.

First Modified Example of Sixth Embodiment

Figure 17:
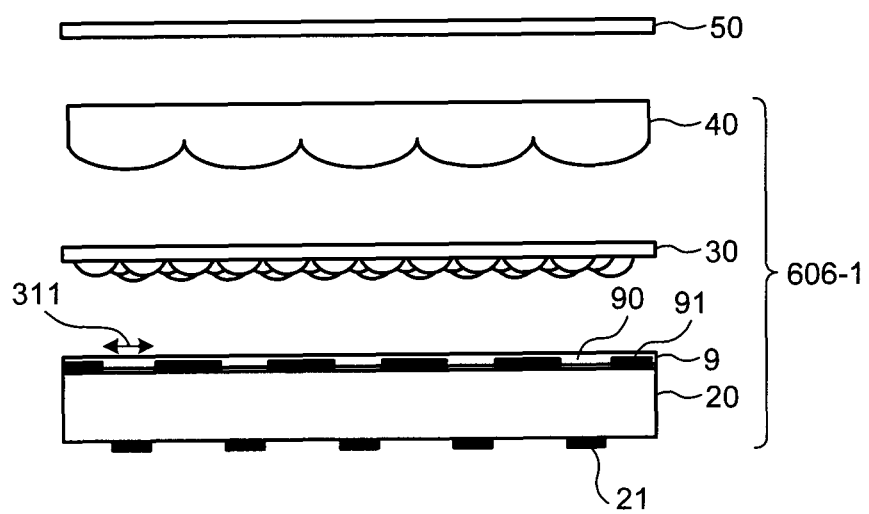
FIG. 17 illustrates an arrangement of a slit array according to a first modified example of the sixth embodiment.

Next, a backlight device 606-1 and a display apparatus according to the first modified example of the sixth embodiment will be described referring to FIG. 17. This modified example is different from the sixth embodiment described above in that an anisotropic diffusing element 30 is added between the slit array 9 and the lenticular sheet 40. The anisotropic diffusing element 30 has the same characteristics as those in the first embodiment described above. In this modified example, the slit array 9 is provided in close contact with the light guide plate 20. In this case, the slit array 9 can be formed by film forming at positions where the light shielding portions 91 of the light guide plate 20 are to be formed by a method such as sputtering a material such as aluminum and silver having reflection characteristics. The configuration and operation of this modified example other than those described above are the same as in the sixth embodiment described above.

In this modified example, the slits 90 are formed directly on the light guide plate 20. It is therefore possible to prevent misalignment of the slits 90 and to improve the accuracy in producing linear light beams.

The method for forming the light shielding portions 91 is not limited to sputtering. For example, if the light guide plate 20 is made of a heat-sensitive material, screen printing may be applied on a material having reflection characteristics. Alternatively, the slit array 9 may be formed and then adhered to the light guide plate 20 so as to be integrated therewith.

Second Modified Example of Sixth Embodiment

Figure 18:
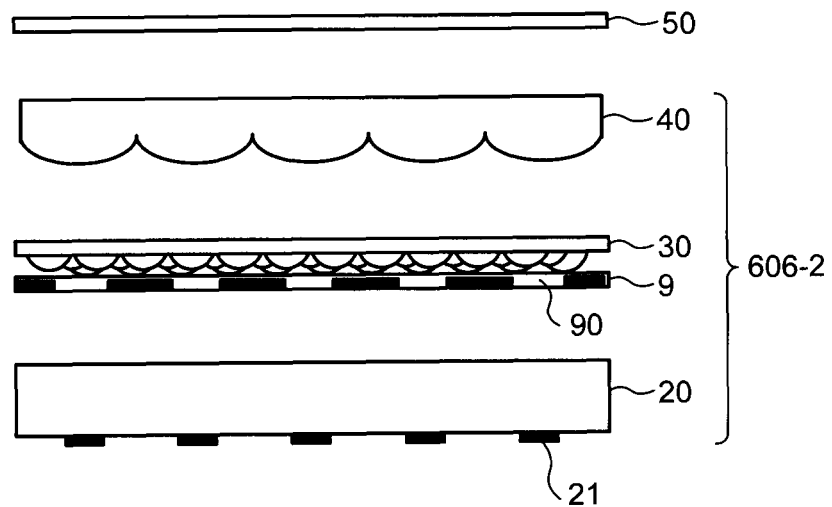
FIG. 18 illustrates an arrangement of a slit array according to a second modified example of the sixth embodiment.

FIG. 18 is a sectional view illustrating a configuration example of a backlight device 606-2 according to the second modified example of this embodiment. As illustrated in FIG. 18, the slit array 9 may be arranged directly on a side of the anisotropic diffusing element 30 facing the light guide plate 20.

Third Modified Example of Sixth Embodiment

Figure 19:
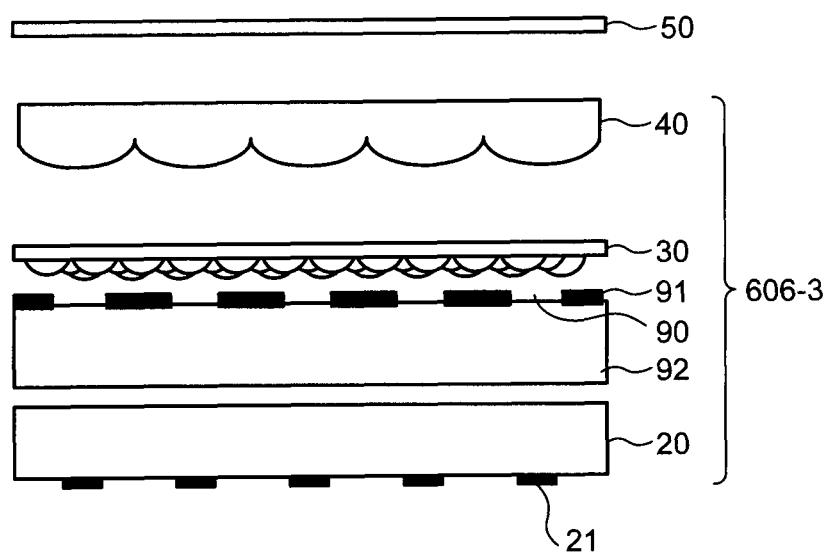
FIG. 19 illustrates an arrangement of a slit array according to a third modified example of the sixth embodiment.

FIG. 19 is a sectional view illustrating a configuration example of a backlight device 606-2 according to the third modified example of this embodiment. As illustrated in FIG. 19, a slit array 9 may be formed on a transparent substrate 92 that is a thick substrate for gap adjustment. The thickness of the transparent substrate 92 is set so as to maintain a gap between the anisotropic diffusing element 30 and the light guide plate 20. In FIG. 19, the slits 90 are formed on a side facing the anisotropic diffusing element 30. This structure facilitates provision of an air layer between the light guide plate 20 and the light shielding portions 91, and thus increases total reflection probability of light propagating through the light guide plate 20. Therefore, the light use efficiency of the light sources 10 can be increased. For example, although a light loss of about 2% is caused if the material used for the light shielding portions 91 is aluminum, the light loss can be prevented with this structure. The slits 90 may alternatively be formed on a side facing the light guide plate 20.

Fourth Modified Example of Sixth Embodiment

Figure 20:
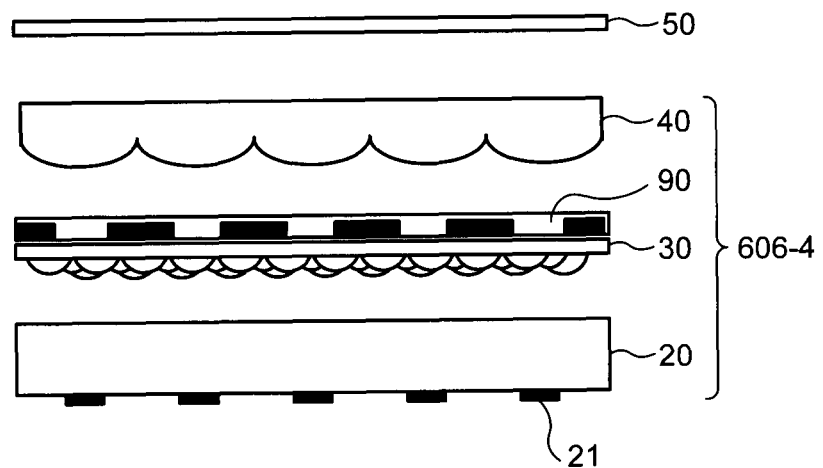
FIG. 20 illustrates an arrangement of a slit array according to a fourth modified example of the sixth embodiment.

FIG. 20 is a sectional view illustrating a configuration example of a backlight device 606-4 according to the fourth modified example of this embodiment. As illustrated in FIG. 20, the slit array 9 may be provided between the lenticular sheet 40 and the anisotropic diffusing element 30. In FIG. 20, the slits 90 are illustrated as being formed directly on a side of the anisotropic diffusing element 30 facing the lenticular sheet 40. Furthermore, in the structure of FIG. 20, it is clear that the slits 90 may be formed in the substrate for gap adjustment as in FIG. 19.

Seventh Embodiment

Figure 21:
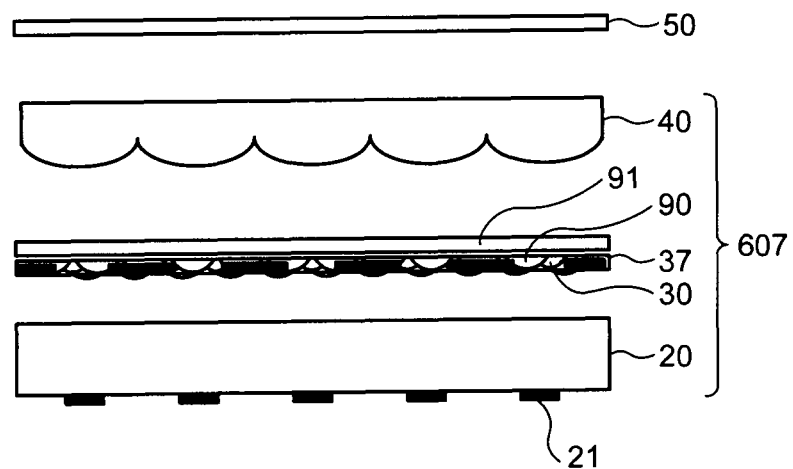
FIG. 21 illustrates openings according to a seventh embodiment.

Next, a backlight device and a display apparatus according to the seventh embodiment will be described referring to FIG. 21. FIG. 21 is a sectional view illustrating a configuration example of a backlight device 607 and a display apparatus according to this embodiment. This embodiment is different from the sixth embodiment described above in the configuration of a light beam controller. That is, a hybrid anisotropic diffusing element 37 having characteristics similar to those of the anisotropic diffusing element 30 described above is provided as the light beam controller. The hybrid anisotropic diffusing element 37 is provided between the lenticular sheet 40 and the light guide plate 20.

The hybrid anisotropic diffusing element 37 is obtained in a manner that the slits 90 of the slit array 9 in the sixth embodiment described above are formed to have the characteristics of the anisotropic diffusing element 30. The slits 90 are formed on the same surface as the anisotropic diffusing element 30, and the slits 90 and the light shielding portions 91 are arranged alternately along the first direction 81.

The hybrid anisotropic diffusing element 37 can be formed by such a method as follows, for example. First, a synthetic resin is introduced into a mold in which portions having an anisotropic diffusion configuration and flat portions are arranged alternately, and molded therein. Next, a silver film is applied to the flat portions. As a result, the hybrid anisotropic diffusing element 37 can be obtained. The configuration and operation of this embodiment other than those described above are the same as in the sixth embodiment described above.

With this configuration, the number of components and the resin material can be reduced, and the backlight device can be made thinner and simpler. Moreover, the anisotropic diffusion capability can also be increased, and a backlight device having more uniform in-plane characteristics can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirits of the inventions.

What is claimed is:

1. A backlight device comprising:
a light source;
a light guide plate formed with a plurality of diffusion portions that diffuse light from the light source;
a light beam controller configured to emit a plurality of linear light beams; and
a directivity control element having a plurality of optical openings, wherein
the optical openings are arranged in a first direction perpendicular to a second direction and extend in the second direction,
the light beam controller emits the linear light beams that extend in a third direction tilted with respect to the second direction, and
the light guide plate has a first region in which the diffusion portions are formed in the third direction and a second region in which no diffusion portions are formed, the first region and the second region being arranged alternately in the first direction.

2. The backlight device according to claim 1, wherein
the light beam controller is an anisotropic diffusing part having a higher diffusion property in a predetermined direction than in directions other than the predetermined direction.

3. The backlight device according to claim 2, wherein
the diffusion portions have dot-like shapes, and dot intervals in the third direction of the diffusion portions are equal to or smaller than a width of light in the third direction that is emitted by each of the diffusion portions and diffused by the anisotropic diffusing part.

4. The backlight device according to claim 2, wherein
the predetermined direction is the third direction.

5. The backlight device according to claim 1, wherein
the diffusion portions have dot-like shapes, and
a width in the first direction of the first region is constant within the light guide plate, and a width in the third direction of the diffusion portions is smaller as the diffusion portions are nearer to the light source.

6. The backlight device according to claim 1, wherein
the diffusion portions have dot-like shapes, and
a width in the first direction of the first region is constant within the light guide plate, and the first region has a smaller density of the diffusion portions as the first region is nearer to the light source.

7. The backlight device according to claim 1, wherein
the light beam controller has a plurality of slits extending in the third direction and arranged in the first direction.

8. The backlight device according to claim 7, wherein
the diffusion portions are arranged at positions opposed to the slits.

9. A display apparatus comprising:
a display panel; and a backlight device that includes
- a light source;
- a light guide plate formed with a plurality of diffusion portions that diffuse light from the light source;
- a light beam controller configured to emit a plurality of linear light beams; and
- a directivity control element having a plurality of optical openings, wherein the optical openings are arranged in a first direction perpendicular to a second direction and extend in a second direction, the light beam controller emits the linear light beams that extend in a third direction tilted with respect to the second direction, and the light guide plate has a first region in which the diffusion portions are formed in the third direction and a second region in which no diffusion portions are formed, the first region and the second region being arranged alternately in the first direction.

* * * * *